United States Patent
Wu (10) Patent No.: US 11,438,832 B2
(45) Date of Patent: Sep. 6, 2022

(54) ALLOCATION METHOD OF COMMUNICATION RESOURCES AND ASSOCIATED BASE STATION FOR MOBILE COMMUNICATION

(71) Applicant: Alpha Networks Inc., Hsinchu (TW)

(72) Inventor: Sih Hong Wu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 517 days.

(21) Appl. No.: 16/217,234

(22) Filed: Dec. 12, 2018

(65) Prior Publication Data

US 2020/0107258 A1    Apr. 2, 2020

(30) Foreign Application Priority Data

Sep. 27, 2018   (TW) ................... 107134192

(51) Int. Cl.
  *H04W 48/20*    (2009.01)
  *H04W 24/10*    (2009.01)
  *H04W 88/12*    (2009.01)

(52) U.S. Cl.
  CPC .......... *H04W 48/20* (2013.01); *H04W 24/10* (2013.01); *H04W 88/12* (2013.01)

(58) Field of Classification Search
  CPC ..... H04W 48/20; H04W 24/10; H04W 88/12; H04W 48/18; H04W 84/12; H04W 88/06; H04W 60/00; H04W 72/04
  See application file for complete search history.

(56) References Cited

U.S. PATENT DOCUMENTS

| 7,444,158 | B2 * | 10/2008 | Shitama ............... | H04W 48/16 455/452.2 |
| 2005/0032535 | A1 | 2/2005 | Shitama et al. | |
| 2013/0155876 | A1 * | 6/2013 | Potra ..................... | H04W 36/14 370/248 |

(Continued)

FOREIGN PATENT DOCUMENTS

| CN | 102265668 | 11/2011 |
| CN | 106341907 | 1/2017 |

(Continued)

OTHER PUBLICATIONS

Taiwan Intellectual Property Office, "Office Action", dated Aug. 5, 2019.

(Continued)

*Primary Examiner* — Marcos L Torres
(74) *Attorney, Agent, or Firm* — WPAT, PC (57) ABSTRACT

An allocation method of communication resources is use with at least a user mobile device, at least first and second wireless network access point devices, and a base station device for mobile communication. In the allocation method, the base station device receives a registration request from the user mobile device; and the base station device determines an order of the first and second wireless network access point devices for the user mobile device to register in according to intensities of signals of the first and second wireless network access point devices, which are measured by the user mobile device, and counts of user mobile devices having registered in the first and second wireless network access point devices, respectively.

18 Claims, 5 Drawing Sheets

(56) References Cited

U.S. PATENT DOCUMENTS

2014/0079022 A1    3/2014  Wang et al.
2016/0373964 A1   12/2016  Nagasaka et al.
2017/0048763 A1    2/2017  Ke et al.

FOREIGN PATENT DOCUMENTS

| CN | 106465243  | 2/2017  |
| CN | 106912084  | 6/2017  |
| CN | 106937339  | 7/2017  |
| CN | 107306381  | 10/2017 |
| CN | 107637136  | 1/2018  |
| CN | 107925905  | 4/2018  |
| WO | 2016184374 | 11/2016 |

OTHER PUBLICATIONS

China Intellectual Property Office, "Office Action", dated Jan. 25, 2022.

\* cited by examiner

| User Mobile Device 111 | SSID-1 | SSID-2 |

FIG. 3A

| Base Station Device for Mobile Communication 10 | SSID-1 | 1 | SSID-2 | 2 |

ALLOCATION METHOD OF COMMUNICATION RESOURCES AND ASSOCIATED BASE STATION FOR MOBILE COMMUNICATION

FIELD OF THE INVENTION

The present invention relates to an allocation method of communication resources, and more particular to an allocation method of communication resources for use with a user equipment and a base station for mobile communication. The present invention also relates to a base station device for mobile communication, with which an allocation method of communication resources is executed.

BACKGROUND OF THE INVENTION

In a mobile communication system, a Long Term Evolution-Wireless Local Area Networks (LTE-WLAN) Aggregation technology (hereinafter referred to as LWA) has been developed, in which two different wireless technology resources LTE and WLAN are aggregated. By way of such a technology, a user equipment (UE), such as a smart phone, can simultaneously transmit and/or receive data by using different wireless technologies, thereby enhancing bandwidth. However, when multiple user equipments (UEs) simultaneously use the LWA technology in the same wireless network (WiFi) environment, the multiple user equipments would rush to the same wireless network. If the resource is not appropriately allocated, no user equipment could share in the benefits of resource aggregation. Therefore, an allocation method of aggregated resources is required to improve overall performance of data transmission.

SUMMARY OF THE INVENTION

Therefore, the present invention provides an allocation method of communication resources is used with at least a user mobile device, at least first and second wireless network access point devices, and a base station device for mobile communication. In the allocation method, the base station device receives a registration request from the user mobile device; and the base station device determines an order of the first and second wireless network access point devices for the user mobile device to register in according to intensities of signals of the first and second wireless network access point devices, which are measured by the user mobile device, and counts of user mobile devices having registered in the first and second wireless network access point devices, respectively.

The present invention further provides a base station device for mobile communication, wherein a base station device for mobile communication is used with at least one user mobile device and at least two wireless network access point devices. The base station device includes: a node device in communication with Internet and wirelessly connected to the at least one user mobile devices and the at least two wireless network access point devices to operate in a heterogeneous network, the node device receiving a registration request from the user mobile device; and an estimating device in communication with the node device, determining an order of the at least two wireless network access point devices for the at least one user mobile device to register in according to intensities of signals of the at least two wireless network access point device, which are measured by the user mobile device, and counts of user mobile devices having registered in the at least two wireless network access point devices, respectively.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
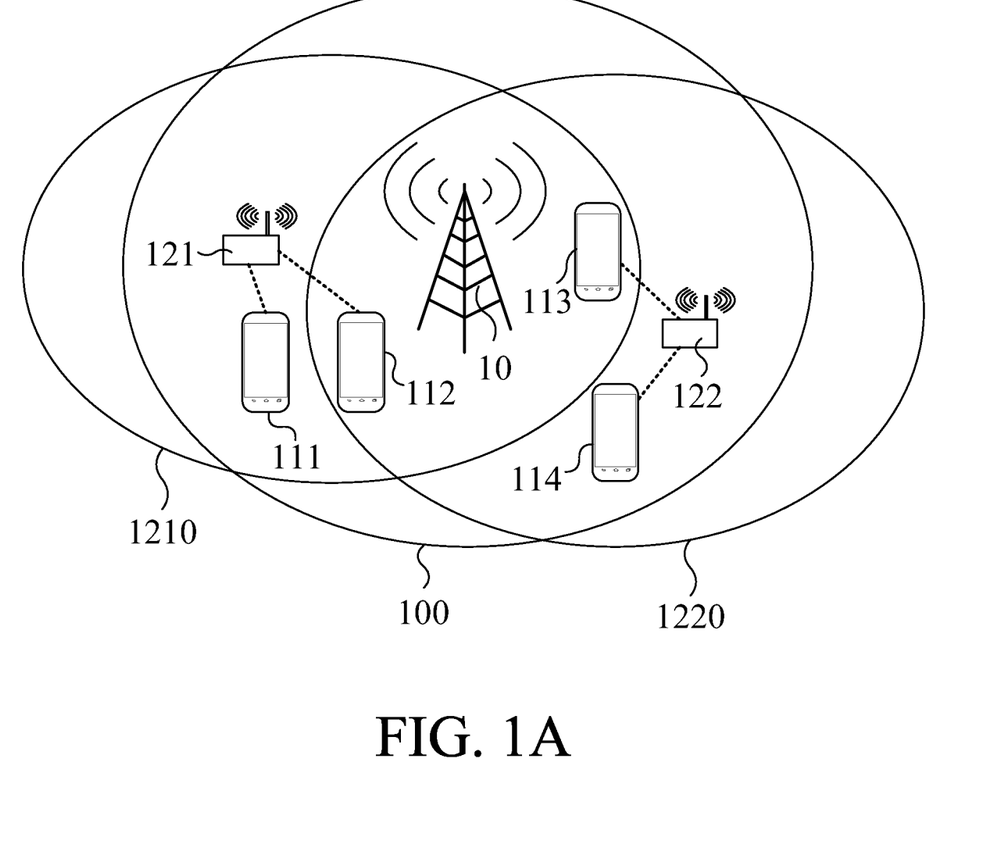
FIG. 1A is a scheme illustrating a communication system developed according to an embodiment of the present invention.

Please refer to FIG. 1A, which is a scheme illustrating a communication system developed according to the present invention. The communication system includes a base station device 10 for mobile communication with a plurality of user equipments (UE), e.g. UEs 111, 112, 113, and 114, which are located within a coverage range of the base station device 10. The base station device 10 may be an Evolved Node B (eNB) defined in the mobile communication specification, and in the Long Term Evolution (LTE) system, the base station device 10 may be an Evolved Universal Terrestrial Radio Access Network Node B (E-UTRAN Node B), and its signal coverage range 100 is as exemplified in FIG. 1A. The user mobile devices 111, 112, 113, and 114 may be personal mobile devices such as smart phones. In addition, as can be seen from the figure, in a range covered by the base station device 10, a plurality of wireless network access point devices, e.g. first wireless network access point device 121 and the second wireless network access point device 122, work with the base station device 10 as a heterogeneous network for mobile communication. For example, the aforementioned LWA technology is one kind of heterogeneous networking technology. In the present embodiment, the first wireless network access point device 121 and the second wireless network access point device 122 are have respective signal coverage ranges 1210 and 1220 as shown.

Figure 1B:
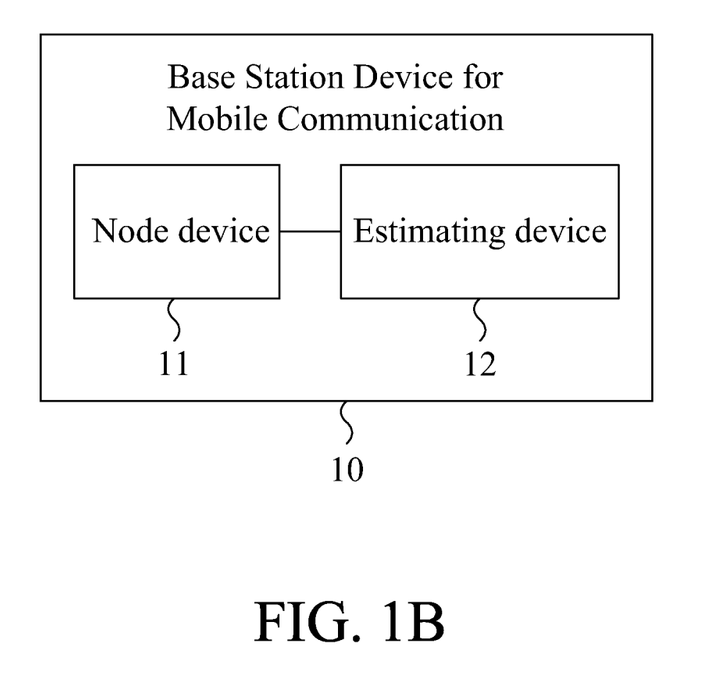
FIG. 1B is a functional block diagram schematically illustrating a base station device according to an embodiment of the present invention, which is applicable to the embodiment illustrated in FIG. 1A as the base station device.

FIG. 1B is a functional block diagram schematically illustrating a main structure of a base station device according to an embodiment of the present invention, which is applicable to the embodiment illustrated in FIG. 1A as the base station device 10. The base station 10 in this embodiment includes a node device 11 and an estimating unit 12. The node device 11 can communicate with the Internet (not shown), and is wirelessly connected to the user mobile devices 111, 112, 113 and 114 and the plurality of wireless network access point devices 121, 122 to operate in a heterogeneous network. The node device 11 receives one or more registering requests from the user mobile devices 111, 112, 113, and 114. The estimating device 12 is in communication with the node device 11, and determines an order of the plurality of wireless network access point devices for a specified user mobile device to register in according to intensities of signals of the plurality of wireless network access point devices measured by the specified user mobile device and counts of user mobile devices having registered in respective wireless network access point devices.

Figure 2:
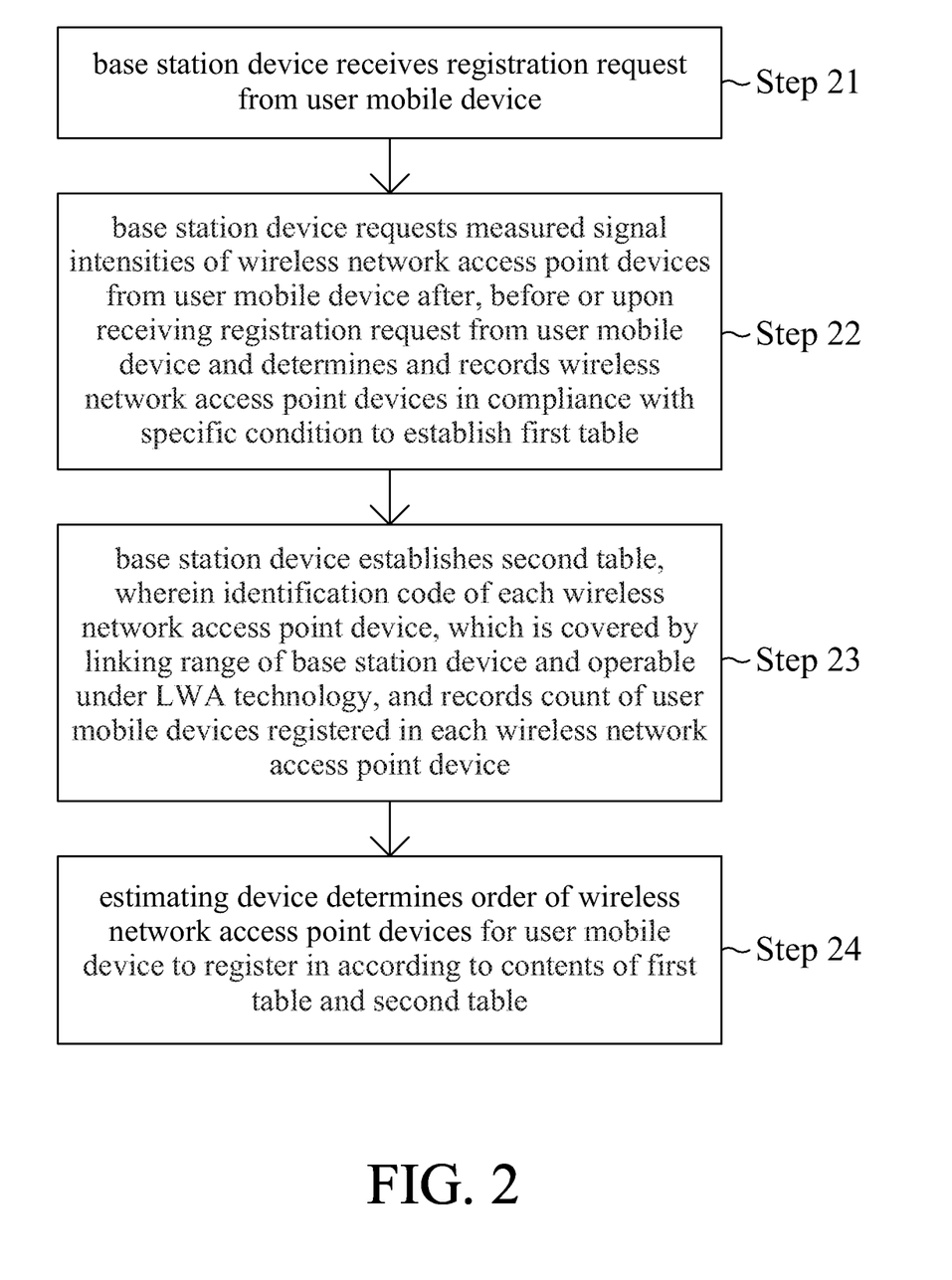
FIG. 2 is a flowchart schematically illustrating an allocation method of communication resources developed according to an embodiment of the present invention.

Referring to FIG. 2, it is a flowchart schematically illustrating an allocation method of communication resources developed according to an embodiment of the present invention. The allocation method is applicable to the above-mentioned LWA heterogeneous network, which involve multiple wireless network access point devices, a base station device for mobile communication, and one or more user mobile devices. In this embodiment, when a first user mobile device (for example, the user mobile device 111) enters a communication range of the base station device 10, the node device 11 of the base station device 10 will receive a registration request from the first user mobile device 111 (Step 21).

Figure 3A:
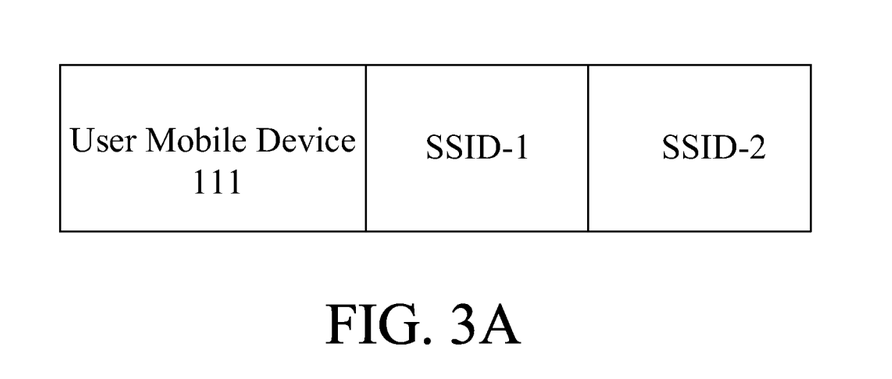
FIG. 3A is a schematic diagram of an example of a first table used in an allocation method of the present invention.

Meanwhile, the user mobile device 111, which has been preset to conduct signal intensity measurement, receives and measures wireless signals from the first wireless network access point device 121 and the second wireless network access point device 122 (and other wireless network access point devices, if any) to realize a first signal intensity and a second signal intensity, respectively. Then the base station device 10 requests information of the first signal intensity and the second signal intensity from the user mobile device 111 after, before or upon receiving the registration request from the user mobile device 111, determines whether the wireless network access point devices, e.g. the wireless network access point devices 121 and 122, comply with a specific condition, and records the information of the wireless network access point device or devices in compliance with a specific condition in a first table (FIG. 2, Step 22). The specific condition may be an indication that the measured signal intensity is greater than a default threshold. In this case, identification code or codes of the wireless network access point device or devices having a signal intensity greater than the default threshold for the user mobile device 111, e.g. Service Set Identifier (SSID), will be recorded in the first table. Referring again to the example shown in FIG. 1A, for the user mobile device 111, both the wireless network access point devices 121 and 122 have a signal intensity higher than the default threshold, so they both will be listed in the first table. The first table may be stored in, for example, the node device 11 or the estimating device 12 of the base station device 10. A schematic diagram of an example of the first table is as shown in FIG. 3A, in which an identification information of the user mobile device 111, and the respective identification codes SSID-1 and SSID-2 of the wireless network access point devices 121 and 122 having a signal intensity greater than the default threshold for the user mobile device 111 are recorded.

Figure 3B:
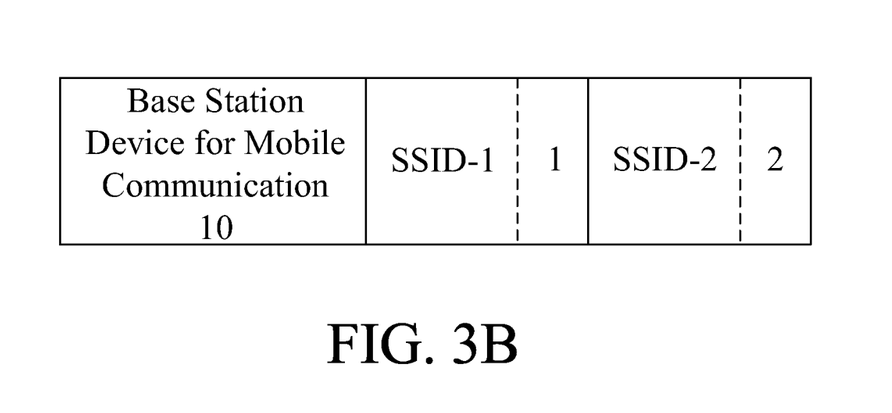
FIG. 3B is a schematic diagram of an example of a second table used in an allocation method of the present invention.

In addition, the base station device 10 can further establish a second table FIG. 2, Step 23). In the second table, the identification code of each wireless network access point device, which is covered by a linking range of the base station device 10 and has used the LWA technique, e.g. SSID-1 and SSID-2 of the wireless network access point devices 121 and 122, and a count of user mobile devices registered in each wireless network access point device 121/122, e.g. 1 and 2, are recorded. For example, a second table is as shown in FIG. 3B, wherein the identification code SSID-1 of the first wireless network access point device 121, a count of user mobile devices registered in the first wireless network access point device 121, the identification code SSID-2 of the second wireless network access point device 122, and a count of user mobile devices registered in the second wireless network access point device 122, are recorded. Preferably, data in the second table is sorted according to the counts of user mobile devices registered in the associated wireless network access point devices, and the wireless network access point devices are arranged in a specified sequence based on respective counts of registered user mobile devices. For example, the fewer the count of user mobile devices registered in a wireless network access point device, the more forward of the wireless network access point device appearing in the second table. Each wireless network access point device is assigned with an index to show its priority for use. The second table can be stored in the node device 11 or the estimating device 12 of the base station device 10.

Next, in Step 24 as shown in FIG. 2, the estimating device 12 of the base station device 10 determines an order of the first wireless network access point device 121, the second wireless network access point device 122, and other wireless network access point devices, if any, for the first user mobile device 111 to register in according to the contents of the first table and the second table.

Figure 4:
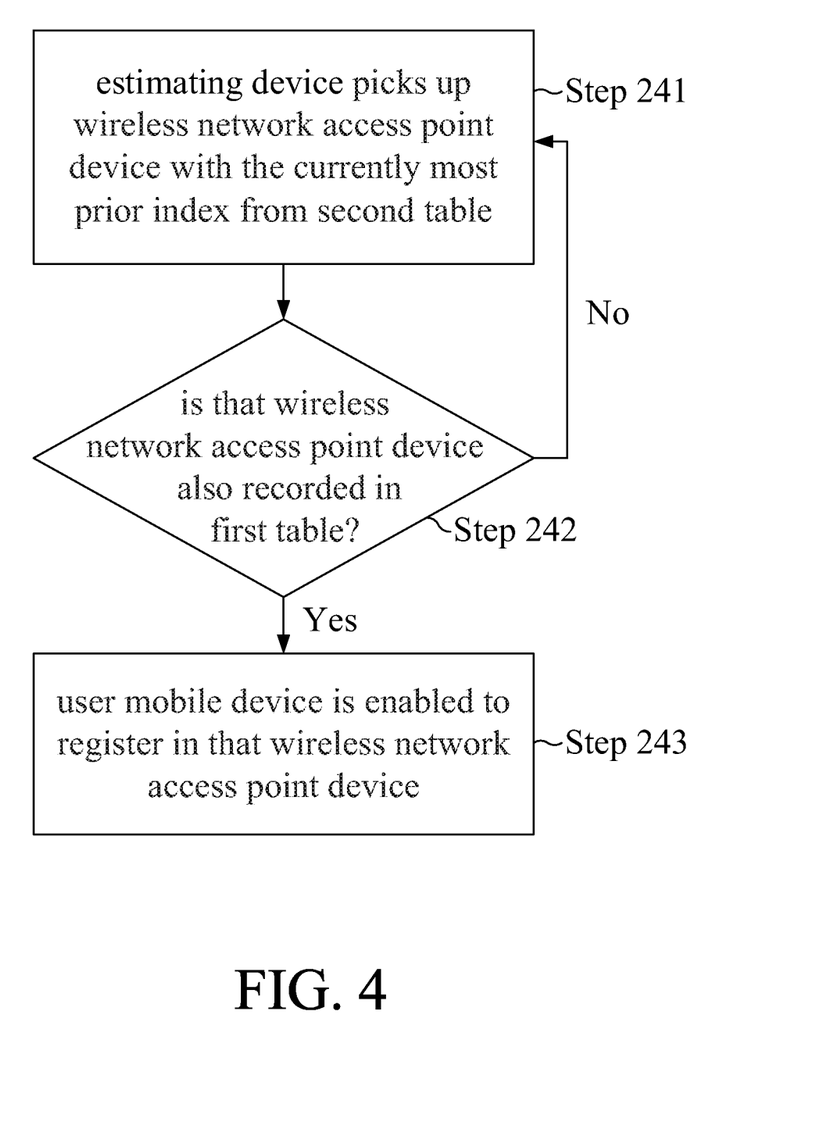
FIG. 4 is a flowchart exemplifying how an estimating device determines the order of wireless network access point devices for a user mobile device to register in according to an embodiment of the present invention.

Step 24 will be described in more details with reference to the flowchart of FIG. 4. First of all, in Step 241, the estimating device 12 picks up the wireless network access point device with the most prior index, e.g. having the highest or lowest index value, from the second table. In this example, the wireless network access point device with the index value "1" is picked up. Then, in Step 242, whether the wireless network access point device with the most prior index is also listed in the first table is checked. If positive, node device 11 issues a command to the first user mobile device 111. In response to the command, the first user mobile device 111 is enabled to register in that wireless network access point device (Step 243). On the other hand, if the wireless network access point device with the most prior index is not listed in the first table, return to Step 241 to pick up the wireless network access point device with the most prior index among the rest of the wireless network access point devices listed in the second table. Likewise, Step 242 is executed to determine whether the wireless network access point device with the most prior index is also listed in the first table, and Step 243 is executed to enable the first user mobile device 111 to register in that wireless network access point device in response to a command from the base station device 10. The steps will be repetitively executed until a proper wireless network access point device is located for the first user mobile device 111 to register.

In a case that there is more than one wireless network access point device having registered therein the same count of user mobile devices, i.e. having the same most prior index in Step 241, and meanwhile having a measured signal intensity greater than the default threshold, i.e. being listed the first table in Step 242, the estimating device 12 is preset to randomly pick up one of them to proceed to Step 243. Alternatively, the automatic pickup function of the estimating device 12 may be disabled under this circumstance, and instead, the node device 11 issues a request to the first user mobile device 111 for selecting one of the wireless network access point devices having the same most prior index and being listed in the first table to proceed to Step 243. For example, in response to the request issued by the node device 11, the first user mobile device 111 selects the one having the greatest intensity from all the qualified wireless network access point devices. Once the selected wireless network access point device is also listed in the first table, subsequent Step 243 can be executed. Otherwise, return to Step 241. It is to be noted that it is also feasible for the first user mobile device 111 to directly register in the selected wireless network access point device without further executing Steps 242, 243 and/or 241 again. Furthermore, whenever an additional user mobile device enters the coverage range of the base station device 10, the base station device 10 restarts the above-described allocation method automatically or in response to a registration request from the additional user mobile device, and the first and second tables are dynamically modified with the changes of the user mobile devices and the wireless network access point devices in order to adaptively match the user mobile devices and the wireless network access point devices.

After the first user mobile device 111 is successfully registered in the screened or selected wireless network access point device, the base station device 10 will acknowledge the complete process for LWA registration, and then update the contents of the second table. On the other hand, if the first user mobile device 111 cannot be successfully registered in the screened or selected wireless network access point device for some reason, for example when the registration times of the first user mobile device for the screened or selected wireless network access point device, the estimating device 12 will automatically pick up next qualifying wireless network access point device for the first user mobile device 111 to register in. It is to be noted that since there would be a plurality of wireless network access point devices located in the coverage range of the same base station device and available for linking of the first user mobile device 111 under the MA structure, interference might occur among the wireless network access point devices. For remedying the situation, the system may use different channels to locate the wireless network access point devices associated with the coverage range of the same base station device 10 to diminish the interference problems. For example, thirteen channels 1-13 may be assigned to respective thirteen wireless network access point devices by the base station device 10, wherein the differentially numbered channels are in different bands. For example, a central frequency of Channel 1 is 2.412 GHz with an operating frequency ranged between 2.401 GHz and 2.423 GHz; and a central frequency of Channel 6 is 2.437 GHz with an operating frequency ranged between 2.42 GHz and 2.448 GHz. It is apparent that Channel 1 and Channel 6 are in different and non-overlapping bands. The assignment of channels may be done by the base station device 10 and aims to adaptively allocate the wireless network access point devices under the LWA structure.

According to the present invention, resources can be effectively used and allocated under the LWA structure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for associating a user mobile device with one of a group of wireless network access point devices mobile communication, the group of wireless network access point devices and the user mobile device all linking to a base station device, the group of wireless network access point devices including a first wireless network access point device and a second wireless network access point device, and the method comprising:

the base station device receiving a registration request from the user mobile device; and the base station device determining an order of the first and second wireless network access point devices for the user mobile device to register in according to intensities of signals of the first and second wireless network access point devices, which are measured by the user mobile device, and counts of user mobile devices having registered in the first and second wireless network access point devices, respectively.

2. The method according to claim 1, wherein the base station device requests information of the first signal intensity and the second signal intensity from the user mobile device, and records the information of the first and/or second wireless network access point devices in compliance with a specific condition in a first table.

3. The method according to claim 2, wherein the base station device further establishes a second table, in which an identification code of the first wireless network access point device, a count of user mobile devices registered in the first wireless network access point device, an identification code of the second wireless network access point device, and a count of user mobile devices registered in the second wireless network access point device are recorded.

4. The method according to claim 3, wherein the base station device determines an order of the first wireless network access point device, and the second wireless network access point device for the user mobile device to register in according to contents of the first table and the second table.

5. The method according to claim 3, wherein when the first and second wireless network access point devices have the same counts of registered user mobile devices according to the second table, one of the first and second wireless network access point devices having a higher signal intensity according to the first table is selected by the user mobile device to register in.

6. The method according to claim 2, wherein the first or second wireless network access point devices is determined to comply with the specific condition when the signal intensity of the corresponding wireless network access point device is greater than a default threshold.

7. The allocation method according to claim 1, further comprising: the base station associating the user mobile device with one of the wireless network access point devices, which has the most prior index for registration.

8. The method according to claim 7, wherein if registration times of the user mobile device into the first or second wireless network access point device have reached a preset number but still fails, another wireless network access point device, which has the second most prior index, will be automatically picked up for the user mobile device to register in.

9. The method according to claim 1, wherein if a count of registered user mobile devices in the first wireless network access point device and a count of registered user mobile devices in the second wireless network access point device are equal, one of the first and second wireless network access point devices having a higher signal intensity is selected by the user mobile device to register in.

10. A base station device for mobile communication, for use with at least one user mobile device and at least two wireless network access point devices, comprising:
- a node device in communication with Internet and wirelessly connected to the at least one user mobile devices and the at least two wireless network access point devices to operate in a heterogeneous network, the node device receiving a registration request from the user mobile device; and
- an estimating device in communication with the node device, determining an order of the at least two wireless network access point devices for the at least one user mobile device to register in according to intensities of signals of the at least two wireless network access point device, which are measured by the user mobile device, and counts of user mobile devices having registered in the at least two wireless network access point devices, respectively.

11. The base station device according to claim 10, wherein the node device requests information of the first signal intensity and the second signal intensity from the user mobile device, and records the information of the first and/or second wireless network access point devices in compliance with a specific condition in a first table.

12. The base station device according to claim 11, wherein the node device further establishes a second table, in which identification codes of the at least two wireless network access point devices, and respective counts of user mobile devices registered in the at least two wireless network access point devices are recorded.

13. The base station device according to claim 12, wherein the estimating device determines an order of the at least two wireless network access point devices for at least one user mobile device to register in according to contents of the first table and the second table.

14. The base station device according to claim 12, wherein when the estimating device determines that two of the at least two wireless network access point devices have the same counts of registered user mobile devices according to the second table, one of the at least two wireless network access point devices, which has a higher signal intensity according to the first table is selected by the at least one user mobile device to register in.

15. The base station device according to claim 11, wherein any of the at least two wireless network access point devices is determined to comply with the specific condition when the signal intensity of the corresponding wireless network access paint device is greater than a default threshold.

16. The base station device according to claim 10, further comprising: the node device associating the user mobile device with one of the wireless network access point devices, which has the most prior index, for registration.

17. The base station device according to claim 13 wherein if registration times of the at least one user mobile device into one of the at least two wireless network access point devices have reached a preset number but still fails, another one of the at least two wireless network access point devices, which has the second most prior index, will be automatically picked up by the node device for the user mobile device to register in.

18. The base station device according to claim 10, wherein if a count of registered user mobile devices in one of the at least two wireless network access point device and a count of registered user mobile devices in another one of the at least two wireless network access point devices are equal, one of the at least two wireless network access point devices, which has a higher signal intensity is selected by the user mobile device to register in.

* * * * *